No. 866,722.
PATENTED SEPT. 24, 1907.
E. A. HESS
WEEDER.
APPLICATION FILED JUNE 4, 1906.
2 SHEETS—SHEET 1.
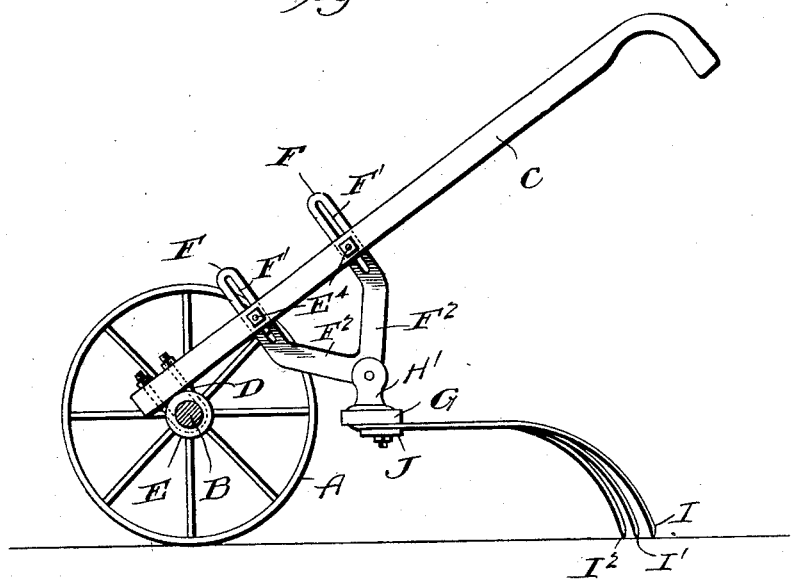
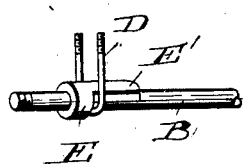
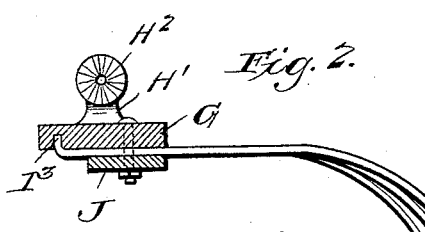
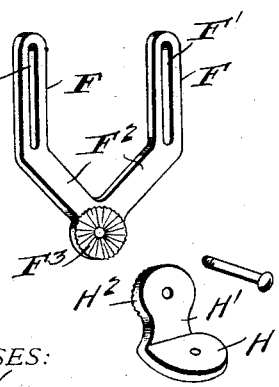
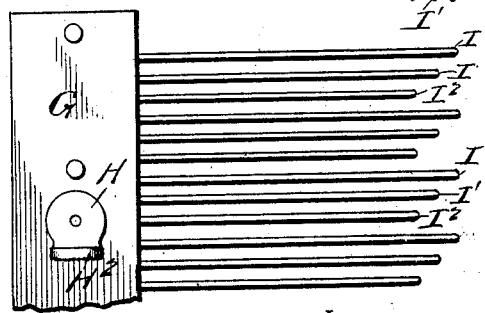
WITNESSES:
INVENTOR
Edgar A. Hess,
BY
Attorney

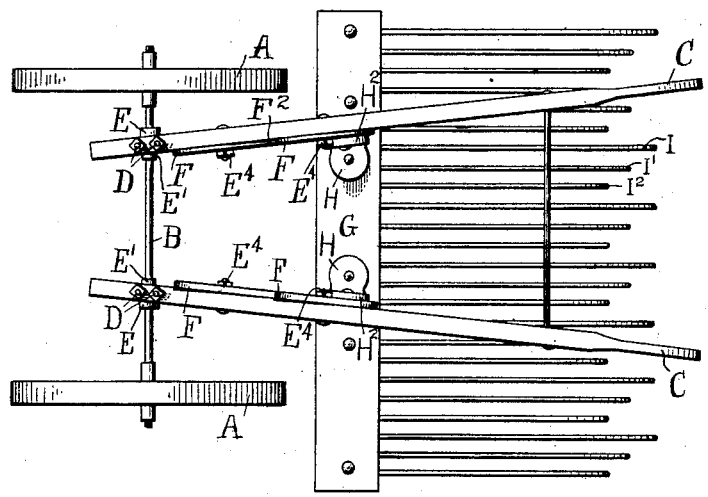

UNITED STATES PATENT OFFICE.

EDGAR A. HESS, OF KENDALLVILLE, INDIANA.

WEEDER.

No. 866,722.  Specification of Letters Patent.  Patented Sept. 24, 1907.

Application filed June 4, 1906. Serial No. 319,985.

*To all whom it may concern:*

Be it known that I, EDGAR A. HESS, a citizen of the United States, residing at Kendallville, in the county of Noble and State of Indiana, have invented certain new and useful Improvements in Weeders, of which the following is a specification.

This invention consists of certain new and useful improvements in weeders, and has particular relation to the class of weeders known as hand weeders.

The principal object of the invention is to provide a manually operable weeder in which the various parts may be readily adjusted in accordance with the character of the work to be performed and the size of the person operating the apparatus, and also to provide a machine in which the various parts may be readily attached or detached.

Another object of the invention resides in the provision of adjustable shoulders for the axle which permit of the use of wheels of any size of hub.

Another object of the invention resides in the arrangement of the rake teeth, so that the said teeth will be arranged in rows or sets of teeth.

Other and further objects and advantages of the invention will be apparent from the following detailed description and claims, when taken in connection with the annexed sheet of drawings.

In the drawings—Figure 1 is a sectional view illustrating one side of the weeder, it being understood that the other side is, of course, identical with the side shown in this view. Fig. 2 is a detail sectional view of the rake head or bar, illustrating the details of attachment of the rake teeth to the said head. Fig. 3 is a plan view of a portion of the rake head or bar and rake teeth, illustrating the arrangement or grouping of the rake teeth. Fig. 4 is a detail view of a portion of the axle, having one of the adjustable collars or shoulders mounted thereon. Fig. 5 is a detail perspective view of the handle bracket and the rake head or bar bracket, the same being shown detached. Fig. 6 is a top plan view of the weeder.

Like letters of reference refer to corresponding parts.

In the accompanying drawings I have illustrated only so much of the invention as will be necessary for a complete understanding, it being understood that while, for instance, but one handle, one wheel, and one set of brackets for connecting the rake head or bar with the handle are shown in the said drawings, in the practical application of my invention each of such parts are duplicated—one on each side, as is usual in this type of machines.

Referring to the accompanying sheet of drawings, A designates one of the wheels of the machine, the same being located at the front of the machine, and B designates the axle for said wheels.

C designates one of the handles, which has its front end portions attached to the axle B by means of the U-shaped clips D, the rear end of said handles terminating in the usual hand holds.

E designates one of the adjustable collars or shoulders which are slidingly mounted upon the axle. This collar or shoulder E is provided with an extension E' which partly surrounds the axle B, and this extension is caught under and held in the desired position upon the axle by means of the clips D.

In the assembling of the parts as thus far described, the collars or shoulders are placed upon the axle with extensions extending inwardly, the wheels are then mounted upon the axle, and the axle-nut placed in position. The collar or shoulder is then slid up against the hub of the wheel, and then the handle clips are placed over the axle so as to bear upon the extension of the collar or shoulder, and then the handles are attached to the clips.

Each of the handles has mounted thereon an adjustable bracket, the same consisting of the two vertical arms F, F, each being provided with a central, elongated slot F', F', the said vertical arms F, F, terminating in the converging arms $F^2$, $F^2$, the arms $F^2$, $F^2$, in turn, terminating in a circular portion $F^3$, the face of which is corrugated, and through this corrugated face a central, circular opening is formed. Bolts or set screws $E^4$, $E^4$, pass through the slotted portion of this bracket and enter the handle, thereby providing a means for retaining the brackets in the desired adjusted position relatively to the handles.

G designates a rake head or bar, and upon the upper face of this rake head or bar are provided two brackets (only one being shown in the drawing) which are adapted to be attached to the lower portion of the handle brackets. The said brackets upon the rake head or bar each consist of the lower horizontal portion H having a vertical extension H', which terminates in a circular upper portion $H^2$, the face of which is corrugated similar to the corrugated portion of the handle bracket, and a central circular opening is formed through this said circular upper portion.

In connecting the rake head or bar brackets with the handle brackets, the handle brackets are first set in the desired position relatively to the handles, and then the corrugated faces of the handle brackets and the rake head brackets are brought together and bolts are passed through the openings in both of the corrugated faces, thereby locking them together.

Referring to Fig. 3 of the drawings, it will be seen that the rake teeth are set in groups I, I' and $I^2$, so as to make three rows of teeth. The inner ends of the rake teeth extend under the rake head or bar and have their ends $I^3$ passed into the said rake head or bar. A plate J is placed under the rake head or bar with the portions of the rake teeth between it and the rake head or bar, and by means of bolts, this plate J is drawn tightly up thereby clamping the rake teeth to the rake head or bar.

From the foregoing it will be readily seen that in order to adjust the height of the handles relatively to the person using the machine, such adjustment is readily obtained by means of the handle brackets and their sliding connection with the handles. And in order to adjust the rake teeth relatively to the work being performed, such adjustment is readily obtained by releasing the bolt which holds the two corrugated faces of the two brackets in engagement, and the teeth can then be set in the desired position, after which the said corrugated faces are brought into rigid engagement by means of the bolt.

Having described my invention, what I claim is—

1. An implement as described, comprising an axle, collars slidably mounted on the axle and having laterally extending portions, handles attached to the laterally-extending portions of the collars, a bar adjustably connected with the handles and carrying earth-engaging members.

2. An implement as described, comprising an axle, collars slidably mounted on said axle and each being provided with an extended portion, handles, clips for securing the front ends of the handles to the axle, said clips also serving to retain the sliding collars in desired positions, a bar having an adjustable connection with the handles, earth-engaging members carried by the bar, and means for clamping said members to the bar.

In testimony whereof I have signed my name to this specification in the presence of two subscribing witnesses.

EDGAR A. HESS.

Witnesses:
FRED L. BODENHAFER,
C. W. KIMMEL.